United States Patent
Iwamoto et al.

(10) Patent No.: US 7,675,560 B2
(45) Date of Patent: Mar. 9, 2010

(54) SOLID-STATE IMAGE SENSING DEVICE

(75) Inventors: Tsuyoshi Iwamoto, Nishinomiya (JP); Shigehiro Miyatake, Osaka (JP)

(73) Assignee: Konica Minolta Holdings, Inc., Tokyo (JP)

( * ) Notice: Subject to any disclaimer, the term of this patent is extended or adjusted under 35 U.S.C. 154(b) by 464 days.

(21) Appl. No.: 11/803,193

(22) Filed: May 14, 2007

(65) Prior Publication Data

US 2007/0279505 A1    Dec. 6, 2007

(30) Foreign Application Priority Data

May 16, 2006    (JP) .............................. 2006-136384

(51) Int. Cl.
*H04N 3/14* (2006.01)
(52) U.S. Cl. .................................... 348/294
(58) Field of Classification Search ................. 348/294
See application file for complete search history.

(56) References Cited

U.S. PATENT DOCUMENTS

| | | | | |
|---|---|---|---|---|
| 5,148,268 A | * | 9/1992 | Tandon et al. | 348/280 |
| 5,933,183 A | * | 8/1999 | Enomoto et al. | 347/241 |
| 6,728,009 B1 | * | 4/2004 | Hemmings et al. | 358/474 |
| 2002/0093649 A1 | * | 7/2002 | Brass | 356/237.1 |

FOREIGN PATENT DOCUMENTS

| | | |
|---|---|---|
| JP | 10-51602 A | 2/1998 |
| JP | 2002-142078 A | 5/2002 |

OTHER PUBLICATIONS

SONY CX-PAL (vol. 65), pp. 12-13; http://www.sony.net/Products/SC-HP/cx_news/vol41/np_ilx146k.html; Jun. 2007; Together with an English-language translation thereof.

* cited by examiner

*Primary Examiner*—Jason Chan
*Assistant Examiner*—Tuan H Le
(74) *Attorney, Agent, or Firm*—Sidley Austin LLP

(57) ABSTRACT

A solid-state image sensing device is provided with n one-dimensional pixel arrays for sensing a document image by relative movement of the one-dimensional pixel arrays and the document image in a scanning direction. The solid-state image sensing device includes: an image readout circuit, commonly provided for the one-dimensional pixel arrays, for performing a horizontal readout operation from the one-dimensional pixel arrays with respect to image data acquired by sensing the document image, wherein a pixel array pitch of the one-dimensional pixel arrays in the scanning direction is set to at least (n+1)/n times as large as a pixel width of each of pixels constituting the one-dimensional pixel arrays in the scanning direction, where the symbol "n" represents a positive integer of 2 or more, and the symbol "/" represents division.

10 Claims, 9 Drawing Sheets

SOLID-STATE IMAGE SENSING DEVICE

This application is based on Japanese Patent Application Nos. 2006-136384 and 2007-105829 filed on May 16, 2006 and Apr. 13, 2007, the contents of which are hereby incorporated by reference.

BACKGROUND OF THE INVENTION

1. Field of the Invention

The present invention relates to a solid-state image sensing device, and more particularly to a color linear image sensor.

2. Description of the Related Art

Conventionally, a solid-state image sensing device i.e. a CCD (Charge Coupled Device) linear image sensor has been used in a document reading apparatus such as a scanner, a facsimile machine, or a copying machine. In recent years, a color linear image sensor has also been widely used. There is known a solid-state image sensing device i.e. a color linear image sensor provided with pixel arrays of R, G, and B i.e. one-dimensional pixel arrays as disclosed in e.g. Japanese Unexamined Patent Publication No. 2002-142078 (D1). In use of the solid-state image sensing device in a document reading apparatus or a like apparatus, a scanning operation is performed by mechanically moving the solid-state image sensing device, or a focusing optical system, or a document in the document reading apparatus. In a normally operated condition, the one-dimensional pixel arrays are operative to successively read a document image at an identical position. If, however, a pitch of the one-dimensional pixel arrays is unduly large, an image at respective displaced positions may be read due to an operation error of the mechanical scanning operation. If the solid-state image sensing device is a color image sensor, an unduly large color displacement may occur in a reproduced image. In view of this, it is desirable to reduce the pitch of the one-dimensional pixel arrays.

In the conventional CCD linear image sensor, it is necessary to provide transfer gates and CCD shift registers between the one-dimensional pixel arrays in view of the construction of the image sensor. For instance, in the case where a solid-state image sensing device has three or more one-dimensional pixel arrays as disclosed in e.g. D1, the pitch of the one-dimensional pixel arrays is about four times as large as the pixel width i.e. the size of each pixel constituting the one-dimensional pixel arrays in a scanning direction. This may make it difficult to suppress the color displacement.

To solve the above drawback, e.g. Japanese Unexamined Patent Publication No. Hei 10-51602 (D2) or SONY CX-PAL (vol. 65), pp. 12-13 (D3) discloses a solid-state image sensing device, in which one-dimensional pixel arrays are arranged close to each other, in other words, the pitch of the one-dimensional pixel arrays is substantially identical to the pixel width of the one-dimensional pixel arrays in the scanning direction. It is, however, impossible to realize an arrangement that all the pixel array pitches of three or more one-dimensional pixel arrays are substantially identical to the pixel width in the solid-state image sensing device disclosed in D2. Also, it is required to reduce the pixel width i.e. the pixel size of at least one pixel array in a direction perpendicular to the scanning direction, in the solid-state image sensing device disclosed in D1. Consequently, this may make it difficult to design the solid-state image sensing device, or may lower the sensitivity in reading a document image.

SUMMARY OF THE INVENTION

In view of the above problems residing in the conventional examples, it is an object of the present invention to provide a simple-structured solid-state image sensing device that enables to read an image, with a reduced pitch of one-dimensional pixel arrays, and suppressed color displacement in a reproduced image resulting from a scanning failure or the like.

A solid-state image sensing device according to an aspect of the invention is provided with n one-dimensional pixel arrays for sensing a document image by relative movement of the one-dimensional pixel arrays and the document image in a scanning direction. The solid-state image sensing device includes: an image readout circuit, commonly provided for the one-dimensional pixel arrays, for performing a horizontal readout operation from the one-dimensional pixel arrays with respect to image data acquired by sensing the document image, wherein a pixel array pitch of the one-dimensional pixel arrays in the scanning direction is set to at least (n+1)/n times as large as a pixel width of each of pixels constituting the one-dimensional pixel arrays in the scanning direction, where the symbol "n" represents a positive integer of 2 or more, and the symbol "/" represents division.

These and other objects, features and advantages of the present invention will become more apparent upon reading the following detailed description along with the accompanying drawing.

DETAILED DESCRIPTION OF THE PREFERRED EMBODIMENTS

Figure 1:
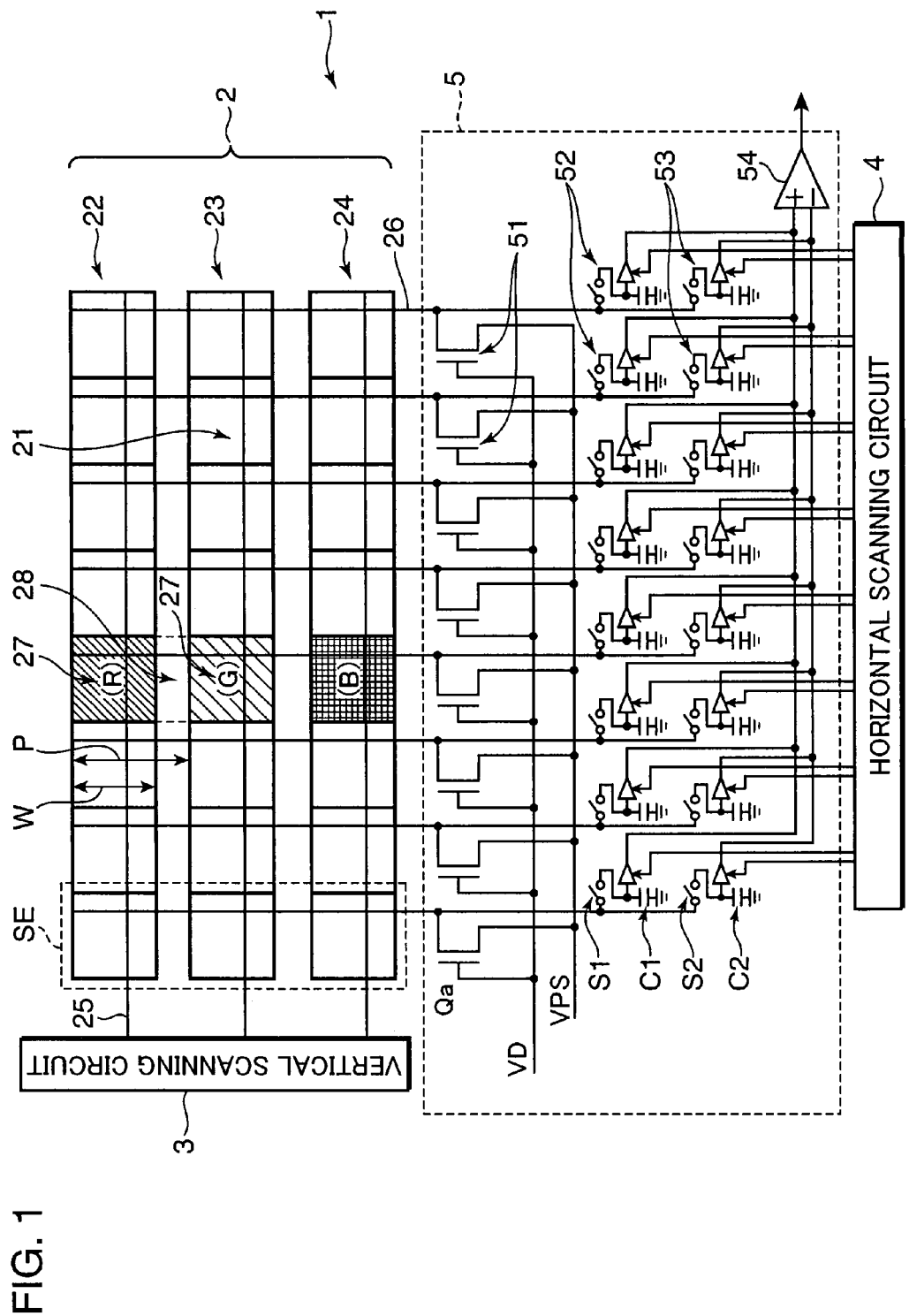
FIG. 1 is a schematic diagram showing an arrangement of a linear sensor, as an example of a solid-state image sensing device embodying the invention.

FIG. 1 is a schematic diagram showing an arrangement of a linear sensor, as an example of a solid-state image sensing device embodying the invention. The linear sensor 1 shown in FIG. 1 includes a sensing section 2, a vertical scanning circuit 3, a horizontal scanning circuit 4, and a readout circuit 5. The sensing section 2 has a certain number of pixels 21, and is adapted to photoelectrically convert incident light representing a subject light image into an image signal commensurate with the amount of the incident light for output. The sensing section 2 includes sensor arrays i.e. pixel arrays or one-dimensional pixel arrays of R (Red), G (Green), and B (Blue), each of which is an array in which a certain number of the pixels 21 are linearly arranged, in other words, includes an R sensor array 22, a G sensor array 23, and a B sensor array 24.

The R sensor array 22, the G sensor array 23, and the B sensor array 24 have color filters (not shown) of R, G, and B on light receiving surfaces of the respective pixels 21 for transmitting light of the respective colors.

The vertical scanning circuit 3 is a vertical shift register for performing a vertical scanning with respect to the sensing section 2, and sequentially scans row selection signal lines 25 corresponding to the R, G, and B sensor arrays 22, 23, and 24, respectively. The horizontal scanning circuit 4 is a horizontal shift register for performing a horizontal scanning with respect to the sensing section 2, and sequentially scans vertical signal lines 26 i.e. column selection signal lines or output signal lines corresponding to the pixels 21 of the R sensor array 22, the G sensor array 23, and the B sensor array 24.

The readout circuit 5 is a circuit for sequentially reading out image signals i.e. photoelectric conversion signals that have been outputted from the pixels 21 of the R, G, and B sensor arrays 22, 23, and 24 to the output signal lines 26 pixel by pixel in accordance with a horizontal scanning operation by the horizontal scanning circuit 4. The readout circuit 5 is a horizontal readout circuit for performing a horizontal readout operation. In this embodiment, there is provided the single readout circuit 5 with respect to the sensing section 2. The readout circuit 5 is a readout circuit commonly provided for the R, G, and B sensor arrays 22, 23, and 24 i.e. all the pixel arrays. The readout circuit 5 has constant current loads 51, signal sample-and-hold circuits 52, and noise sample-and-hold circuits 53, which are arranged in correspondence to the vertical signal lines 26, and an amplifier 54. Each of the constant current loads 51 includes a load transistor Qa which has a function as an electronic load in response to application of a load voltage i.e. a signal VD to a gate. The signal VD is adapted to control an electric potential so that the potential satisfies an operation range of a source follower amplifier, which will be described later. A signal VPS indicates a voltage to be applied to a source of the load transistor Qa.

Each of the signal sample-and-hold circuits 52 samples an image signal as an inputted analog signal, and temporarily holds the value of the image signal. The signal sample-and-hold circuit 52 has a switch S1 for a signal sample-and-hold operation, and a capacitor C1 for a signal sample-and-hold operation. The signal sample-and-hold circuit 52 realizes the signal sample-and-hold function by charging the signal sample-and-hold capacitor C1, retaining a charged potential, and discharging the charged potential in accordance with an on/off operation of the signal sample-and-hold switch S1. Each of the noise sample-and-hold circuits 53 samples an inputted noise signal, and temporarily holds the value of the noise signal. The noise sample-and-hold circuit 53 has a switch S2 for a noise sample-and-hold operation, and a capacitor C2 for a noise sample-and-hold operation. The noise sample-and-hold circuit 53 realizes the noise sample-and-hold function by charging the noise sample-and-hold capacitor C2, retaining a charged potential, and discharging the charged potential in accordance with an on/off operation of the noise sample-and-hold switch S2.

The amplifier 54 is adapted to obtain image signals, with a variation in FD potential which has been reset by a reset gate i.e. a transistor T11 in the respective pixels 21 of the sensing section 2 being removed, by obtaining a difference between the image signal and the noise signal, which have been obtained by the sample-and-hold operation e.g. by subtracting the noise signal from the image signal.

Figure 2:
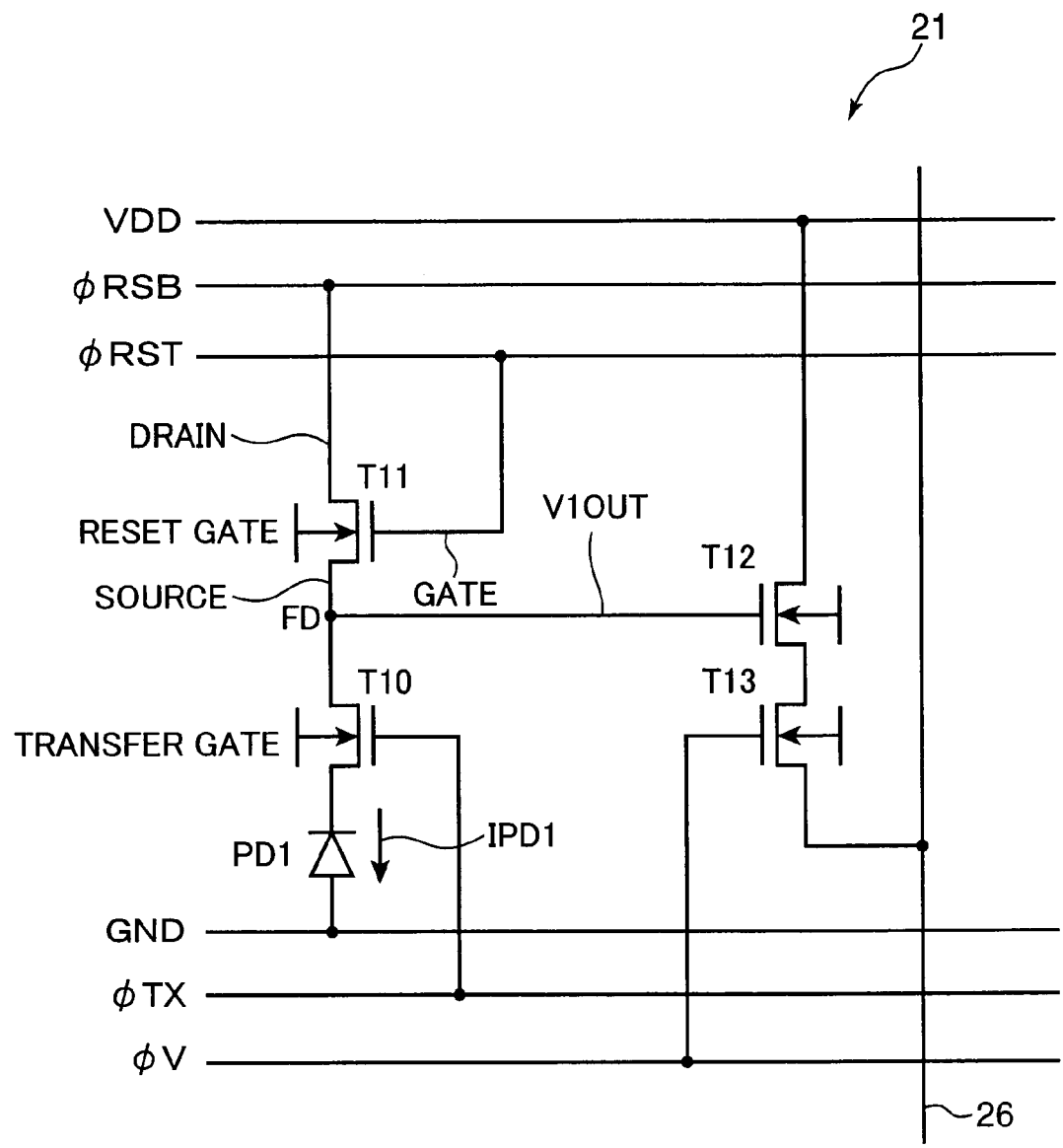
FIG. 2 is a diagram showing a circuit configuration of each pixel in a sensing section of the linear sensor.

FIG. 2 is a diagram showing an exemplified circuit configuration of each pixel 21 in the sensing section 2. The pixel 21 is provided with a photodiode PD1, transistors T10, T11, T12, and T13 as MOSFETs (Metal Oxide Semiconductor Field Effect Transistors), and an FD (Floating Diffusion). In this embodiment, the transistors T10 through T13 are each an N-channel MOSFET. VDD, φRSB, φRST, φTX, and φV denote signals i.e. voltages to be applied to the transistors, and GND denotes the ground.

The photodiode PD1 is a photoelectric converter i.e. a light sensing element, and is adapted to generate an electric signal i.e. a photocurrent IPD1 commensurate with the amount of incident light from a subject. The transistor T12 and the constant current load 51 in pair constitute a source follower amplifier i.e. an amplifying circuit for amplifying a source follower. The transistor T12 amplifies a voltage V1OUT to be described later. The transistor T13 is a transistor for a signal readout operation, and is operated as a switch to be turned on and off in accordance with the voltage i.e. the signal φV to be applied to the gate. The source of the transistor T13 is connected to the vertical signal line 26. When the transistor T13 is turned on, a current amplified by the transistor T12 is outputted to the vertical signal line 26 as an output current. The transistor T10 is operated as a switch to be turned on and off in accordance with the voltage to be applied to the gate of the transistor T10. The transistor T10 functions as a transfer gate for switching over between transfer and non-transfer of the photocurrent IPD1 i.e. an electric charge generated in the photodiode PD1 to the FD in accordance with an on/off operation corresponding to high/low of the gate potential.

The photocurrent IPD1 generated in the photodiode PD1 flows to a parasitic capacitance of the photodiode PD1 to accumulate the electric charge, and a voltage is generated in accordance with the amount of the accumulated charge. In this condition, if the transistor T10 is kept in an on-state, the charge i.e. a negative charge accumulated in the parasitic capacitance is moved to the FD. The FD is a charge retainer for temporarily retaining the charge. The FD serves as a capacitor for converting the retained charge into a voltage. The transistor T11 i.e. a reset gate transistor is adapted to switch over between application and non-application of a reset bias to the FD in accordance with an on/off operation corresponding to high/low of the gate voltage of the transistor T11.

Figure 3:
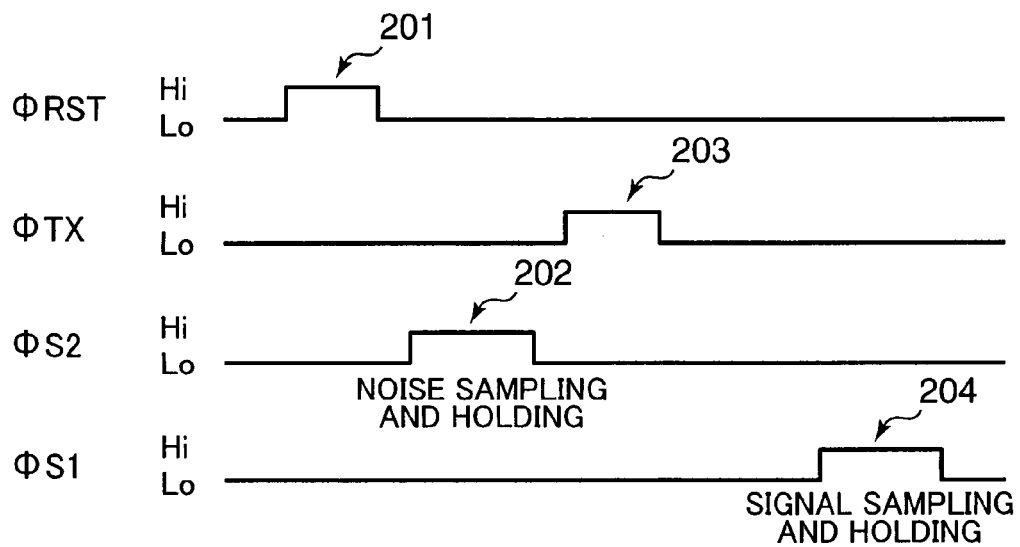
FIG. 3 is a timing chart concerning a sensing operation of the pixel.

FIG. 3 is a timing chart concerning a sensing operation of the pixel 21. Specifically, FIG. 3 shows a timing chart concerning a signal readout operation i.e. a charge sweep operation of each pixel 21 of the R, G, and B sensor arrays 22, 23, and 24 to be executed in performing a vertical scanning after the charge accumulation is completed in a horizontal blank period or a row selecting period by the horizontal scanning circuit 4. In this embodiment, in light of the polarities of the N-channel MOSFET, the signal is turned on when the signal is set Hi (high), and turned off when the signal is set Lo (low). As shown in FIG. 3, after the signal φRST is set Hi at the timing indicated by the reference numeral 201, a sample-and-hold control signal φS2 corresponding to the noise sample-and-hold switch S2 is set Hi at the timing indicated by the reference numeral 202 to read the noise signal from the vertical signal line 26. Thus, the noise signal i.e. a noise level is sampled-and-held by the noise sample-and-hold circuit 53. Then, after the signal φTX is set Hi at the timing indicated by the reference numeral 203, the sample-and-hold control signal φS1 corresponding to the signal sample-and-hold switch S1 is set Hi at the timing indicated by the reference numeral 204 to read the image signal from the vertical signal line 26. Thus, the image signal i.e. a signal level is sampled-and-held by the signal sample-and-hold circuit 52.

Figure 4:
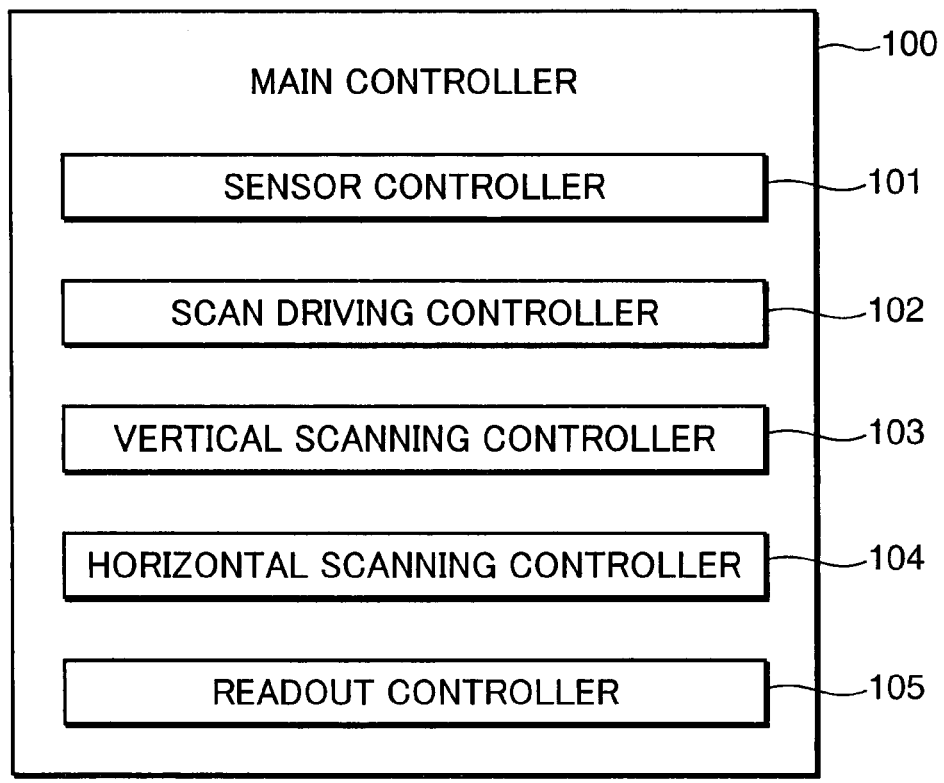
FIG. 4 is a block diagram for describing a scanning operation to be executed by a main controller.

The linear sensor 1 is provided with a main controller for controlling operations of the entirety of the linear sensor 1. Specifically, the main controller includes an ROM for storing various control programs, an RAM for temporarily storing various data, and a central processing unit (CPU) for reading the control program or the like from the ROM for execution. The main controller controls operations of the functioning parts such as the sensing section 2, the vertical scanning circuit 3, the horizontal scanning circuit 4, and the readout circuit 5 of the linear sensor 1. FIG. 4 is a block diagram showing a scanning operation to be executed by the main controller (hereinafter, called as the "main controller 100"). The main controller 100 includes a sensor controller 101, a scan driving controller 102, a vertical scanning controller 103, a horizontal scanning controller 104, and a readout controller 105.

The sensor controller 101 controls sensing operations to be performed by the R, G, and B sensor arrays 22, 23, and 24 of the sensing section 2, and outputs various signals such as VDD, $\phi$RSB, $\phi$RST, $\phi$TX, and $\phi$V with respect to the pixels 21. The scan driving controller 102 performs a driving operation for scanning by moving the linear sensor 1 or a focusing optical system relative to a document for scanning, or by moving the document relative to the linear sensor 1 or the focusing optical system for scanning so that an image is read from the document by the sensing section 2. The focusing optical system is an optical system such as a lens element or a mirror for forming a light image obtained from the document on the light receiving surfaces of the R, G, and B sensor arrays 22, 23, and 24. The linear sensor 1 may be provided with the focusing optical system. The vertical scanning controller 103 controls the vertical scanning circuit 3 to perform a vertical scanning operation with respect to the R, G, and B sensor arrays 22, 23, and 24. The horizontal scanning controller 104 controls the horizontal scanning circuit 4 to perform a horizontal scanning operation with respect to the R, G, and B sensor arrays 22, 23, and 24. The readout controller 105 controls the readout circuit 5 to perform an image readout operation from the R, G, and B sensor arrays 22, 23, and 24. The image readout operation to be executed by the readout controller 105 will be described later in detail.

In the above arrangement, the linear sensor 1 is operated in such a manner that the R, G, and B sensor arrays 22, 23, and 24 are successively selected by the vertical scanning circuit 3, and that image signals are linearly and successively extracted by the common readout circuit 5 and the horizontal scanning circuit 4. The linear sensor 1 is an MOS-type (e.g. CMOS-type) solid-state image sensing device. The linear sensor 1 is operative to select the pixels 21 according to an X-Y address system i.e. an X-Y scanning system by the vertical scanning circuit 3 and the horizontal scanning circuit 4 to extract image signals from the pixels 21.

Figure 5:
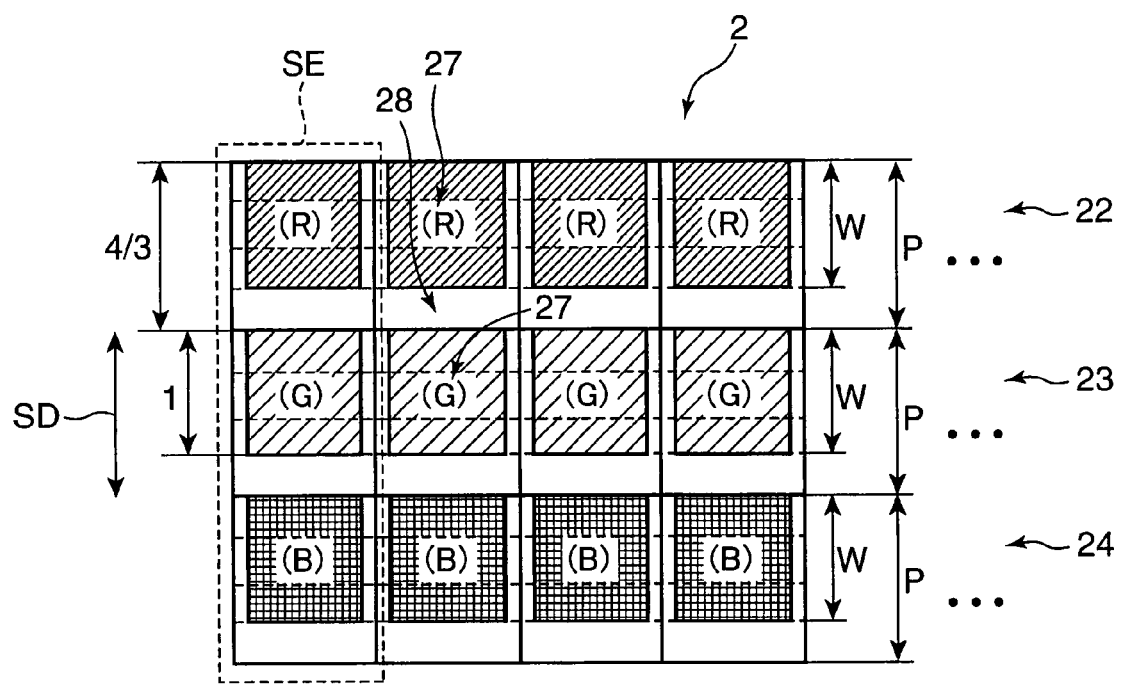
FIG. 5 is a conceptual diagram showing an arrangement of the sensing section.

In this embodiment, primary features reside in the aforementioned arrangement of the sensing section 2 and in the scanning operation to be executed by the sensing section 2. The features are described in the following section. FIG. 5 is a conceptual diagram showing the arrangement of the sensing section 2. As shown in FIG. 5, the pitch (hereinafter, also called as "pixel array pitch P") of the R, G, and B sensor arrays 22, 23, and 24 in the scanning direction SD i.e. a direction perpendicular to the pixel array direction of the sensor arrays i.e. the longitudinal direction of the sensor arrays, or a vertical scanning direction is set to 4/3 times as large as the width (hereinafter, also called as the "pixel width W") of each pixel 27 of the R, G, and B sensor arrays 22, 23, and 24 in the scanning direction SD. In other words, the pixel array pitch P is set to 4 times as large as the width obtained by equally dividing the pixel width W by three. Namely, assuming that the pixel width W is "1", the pixel array pitch P is "⅓" of the pixel width W. Generally expressing the above, the pixel array pitch P is (n+1)/n times as large as the pixel width W where n is a positive integer equal to or larger than 2. The symbol "n" indicates the number of sensor arrays. In the embodiment, the number of sensor arrays is identical to the number of colors i.e. three colors of R, G, and B. Since there are three arrays i.e. R, G, and B sensor arrays 22, 23, and 24, n=3. The condition: n=2 or larger is applied because in the scanning operation method employed in the embodiment, the number of sensor arrays is plural i.e. two or more. The pixels 27 corresponds to the pixels 21. There is defined a spatial gap (hereinafter, called as a "space 28") indicated by the reference numeral 28 between the adjacent pixels 27 of the R, G, and B sensor arrays 22, 23, and 24. The sum of the width of the space 28 in the scanning direction SD, and the pixel width W is defined as the pixel array pitch P.

Figure 6:
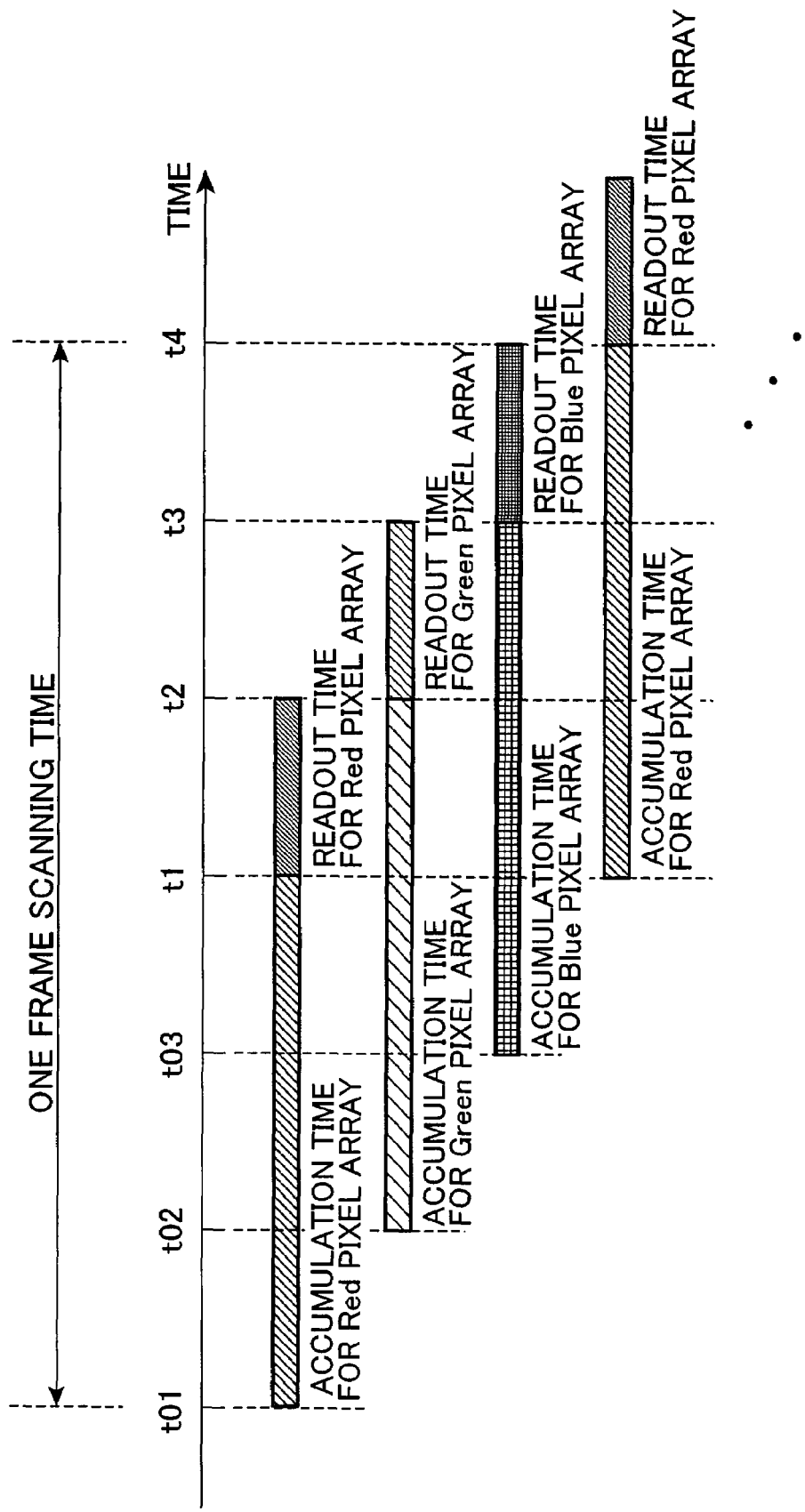
FIG. 6 is a timing chart showing a relation between charge accumulation times i.e. exposure times, and readout times by sensor arrays of R, G, and B in one frame scanning time.
Figure 7:
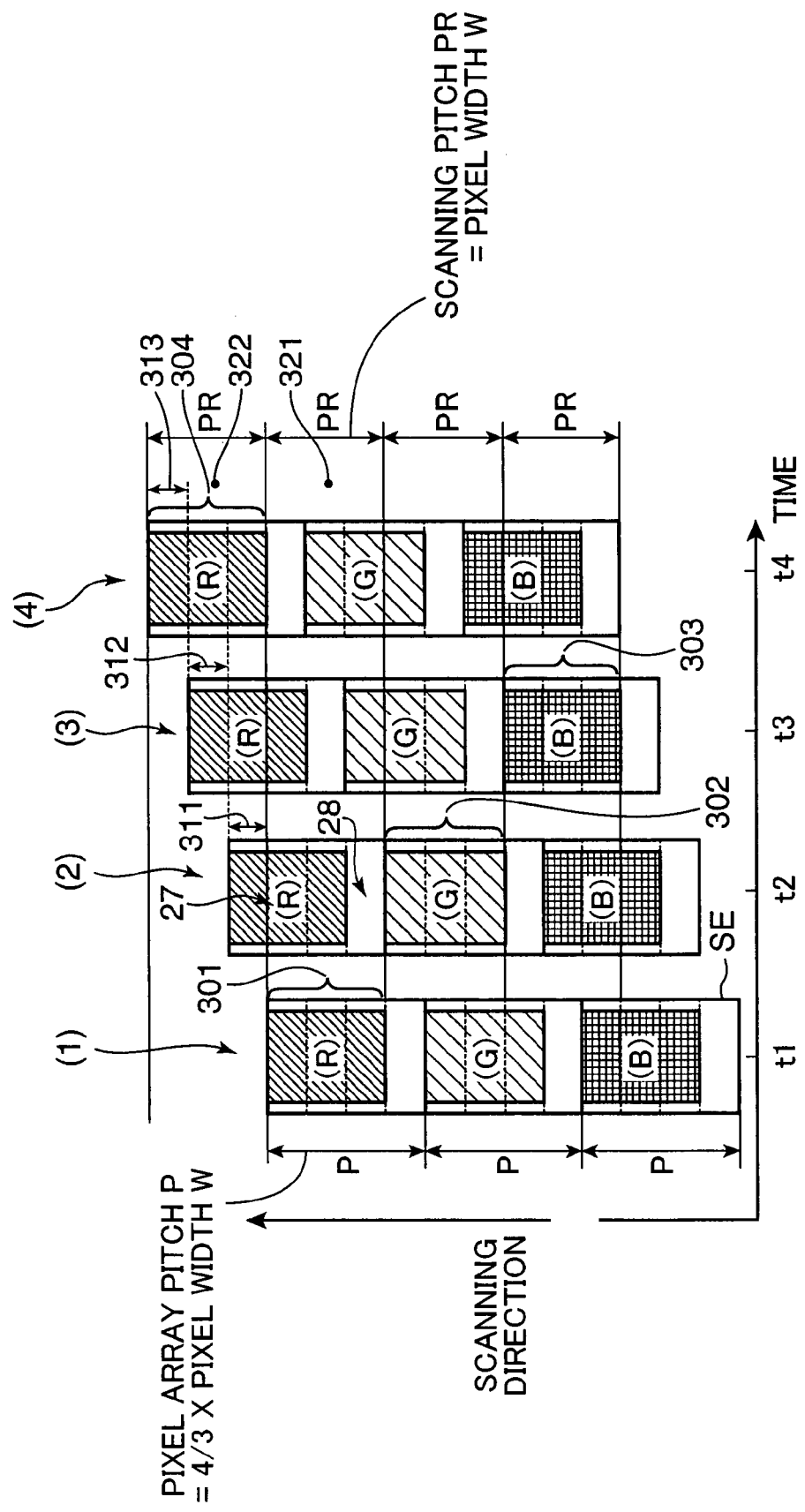
FIG. 7 is a conceptual diagram for describing a scanning operation to be performed by the sensor arrays of R, G, and B.

The sensing section 2 having the above arrangement performs a scanning operation with respect to a document image. The scanning operation to be executed by the sensing section 2 is described referring to FIGS. 6 and 7. FIG. 6 is a timing chart showing a relation between charge accumulation times i.e. exposure times, and readout times concerning R, G and B pixels of the R, G, and B sensor arrays 22, 23, and 24 during one frame scanning operation i.e. one frame scanning time. FIG. 7 is a conceptual diagram for describing the scanning operations to be executed by the R, G, and B sensor arrays 22, 23, and 24. Specifically, FIG. 7 shows a manner that pixels of a certain column in the scanning direction SD among the R, G, and B sensor arrays 22, 23, and 24 e.g. the leftmost pixel column in the sensing section 2 shown in FIG. 1 or FIG. 5 i.e. a pixel column consisting of three pixels 27 of R, G, and B, and two spaces 28 (hereinafter, called as a "pixel column SE") is moved in the scanning direction SD from e.g. the state (1) to the state (4), as time elapses. The embodiment describes an arrangement that the pixel array pitch P is set to 4/3 times as large as the pixel width W.

Referring to FIG. 6, at the point of time t1, a charge accumulation operation concerning the R sensor array 22 (hereinafter, also called as "R pixel array 22"), which has been continued from the point of time t01, is ended, and a readout operation of charge accumulation information i.e. image information concerning the R pixel array 22 is started. The position of the pixel column SE at the point of time t1 is indicated by the state (1) shown in FIG. 7. Assuming that the pitch for scanning a document image by the sensing section 2 is defined as a scanning pitch PR, in the state (1), for instance, the R pixel of the pixel column SE is located at the same position as a document imaging position having a width indicated by the scanning pitch PR (hereinafter, called as "imaging pitch position"). The readout operation concerning the R pixel array 22 which has been started from the point of time t1 is ended at the point of time t2. It is impossible to concurrently read signals from the other sensor arrays during the period from the point of time t1 to the point of time t2, because the readout circuit 5 is single, as mentioned above. As far as the readout operation is executable during the period, the readout operation of the charge accumulation information concerning the R pixel array 22 may not be necessarily continued during the period from the point of time t1 to the point of time t2.

Then, at the point of time t2, a charge accumulation operation concerning the G sensor array 23 (hereinafter, also called as the "G pixel array 23"), which has been continued from the point of time t02, is ended, and a readout operation of charge accumulation information concerning the G pixel array 23 is started. The readout operation concerning the G pixel array 23 is continued until the point of time t3, which will be described later. The position of the pixel column SE at the point of time t2 is indicated by the state (2) shown in FIG. 7. In the state (2), as indicated by the reference numeral 302, the entirety of the linear sensor 1 is moved for scanning until the position of the G pixel of the pixel column SE is coincident with the position of the R pixel of the R pixel array 22 relative to the imaging pitch position at the point of time t1, in other words, until the linear sensor 1 is moved from the position shown in the state (1) by a distance corresponding to one-third of the pixel width W, indicated by the reference numeral 311 i.e. a distance corresponding to one-fourth of the pixel array pitch p.

Then, at the point of time t3, a charge accumulation operation concerning the B sensor array 24 (hereinafter, also called as the "B pixel array 24"), which has been continued from the point of time t03, is ended, and a readout operation of charge accumulation information concerning the B pixel array 24 is started. The readout operation concerning the B pixel array 24 is continued until the point of time t4, which will be described later. The position of the pixel column SE at the point of time t3 is indicated by the state (3) shown in FIG. 7. In the state (3), as indicated by the reference numeral 303, the entirety of the linear sensor 1 is moved for scanning until the position of the B pixel of the pixel column SE is coincident with the position of the R pixel of the R pixel array 22 relative to the imaging pitch position at the point of time t1, in other words, until the linear sensor 1 is moved from the position shown in the state (2) by a distance corresponding to one-third of the pixel width W, indicated by the reference numeral 312.

Then, at the point of time t4, a charge accumulation operation concerning the R sensor array 22, which has been continued from the point of time t1, is ended, and a readout operation of charge accumulation information concerning the R pixel array 22 is started. The position of the pixel column SE at the point of time t3 is indicated by the state (4) shown in FIG. 7. In the state (4), as indicated by the reference numeral 304, the entirety of the linear sensor 1 is moved for scanning until the linear sensor 1 is moved from the position shown by the state (3) by a distance corresponding to one-third of the pixel width W, indicated by the reference numeral 313, in other words, until the R pixel is moved to an imaging pitch position 322 succeeding an imaging pitch position 321 where the document image is sensed when the linear sensor 1 is in the state (1). Hereinafter, similarly to the above, the entirety of the linear sensor 1 is successively moved for scanning by the distance corresponding to one-third of the pixel width W to the states (5), (6), (7), . . . (not shown). Thereby, readout operations from the pixels of the respective colors (hereinafter, called as "color pixels") are successively performed in the order of G→B→R→G→B→ . . . at a timing when the respective positions of the color pixels are coincident with the imaging pitch position. Then, the R pixel is moved from the imaging pitch position 322 to a next imaging pitch position, and readout operations from the R, G, B pixels are successively performed in the similar manner. In this way, the series of scanning operations are carried out with respect to the entirety of the document image. The period from the point of time t01 to the point of time t1 i.e. a charge accumulation time of a certain color pixel is equal to a time required for the certain color pixel e.g. the R pixel of the pixel column SE to move from a certain imaging pitch position to a succeeding imaging pitch position. Accordingly, the time intervals between the points of time t01 and t02, t02 and t03, and t03 and t1 are respectively equal to the time intervals between the points of time t1 and t2, t2 and t3, and t3 and t4.

In the above arrangement, the readout operations with respect to all the pixel arrays of R, G, and B are completed within the time when the R array 22 is moved from the imaging pitch position where the document image is sensed at the point of time t1 to the imaging pitch position where the document image is sensed at the point of time t4 i.e. the period from the point of time t1 to the point of time t4, in other words, within the time when the R array 22 is moved by a distance corresponding to an image resolution pitch representing image resolution performance in the scanning direction SD. In other words, a time corresponding to one-third of the charge accumulation time of one pixel array, corresponding to the time (t4−t1), is allocated to the readout time with respect to the respective R, G, B pixel arrays. This is realized by the scanning operation of the sensing section 2 having the above arrangement. Specifically, as described in the foregoing section concerning the arrangement of the sensing section 2, the pixel arrays of the respective colors are arranged, on the imaging surface of the sensing section 2, spaced apart from each other by the space corresponding to one-third of the pixel width W i.e. the pixel size in the scanning direction, in other words, the pixel array pitch P is set to 4/3 times as large as the pixel width W. If the pixel array pitch P is smaller than the width corresponding to 4/3 times as large as the pixel width W, in other words, if the width of the space 28 between the adjacent pixels 27 of the pixel column SE in the scanning direction SD is smaller than the width 1/n times as large as the pixel width W, imaging positions by the R, G, and B sensor arrays 22, 23, and 24 may be displaced one from the other. In other words, the imaging pitch positions of the color pixels may be displaced one from the other, which may lower the quality of reproduced image data due to color displacement.

Figure 8:
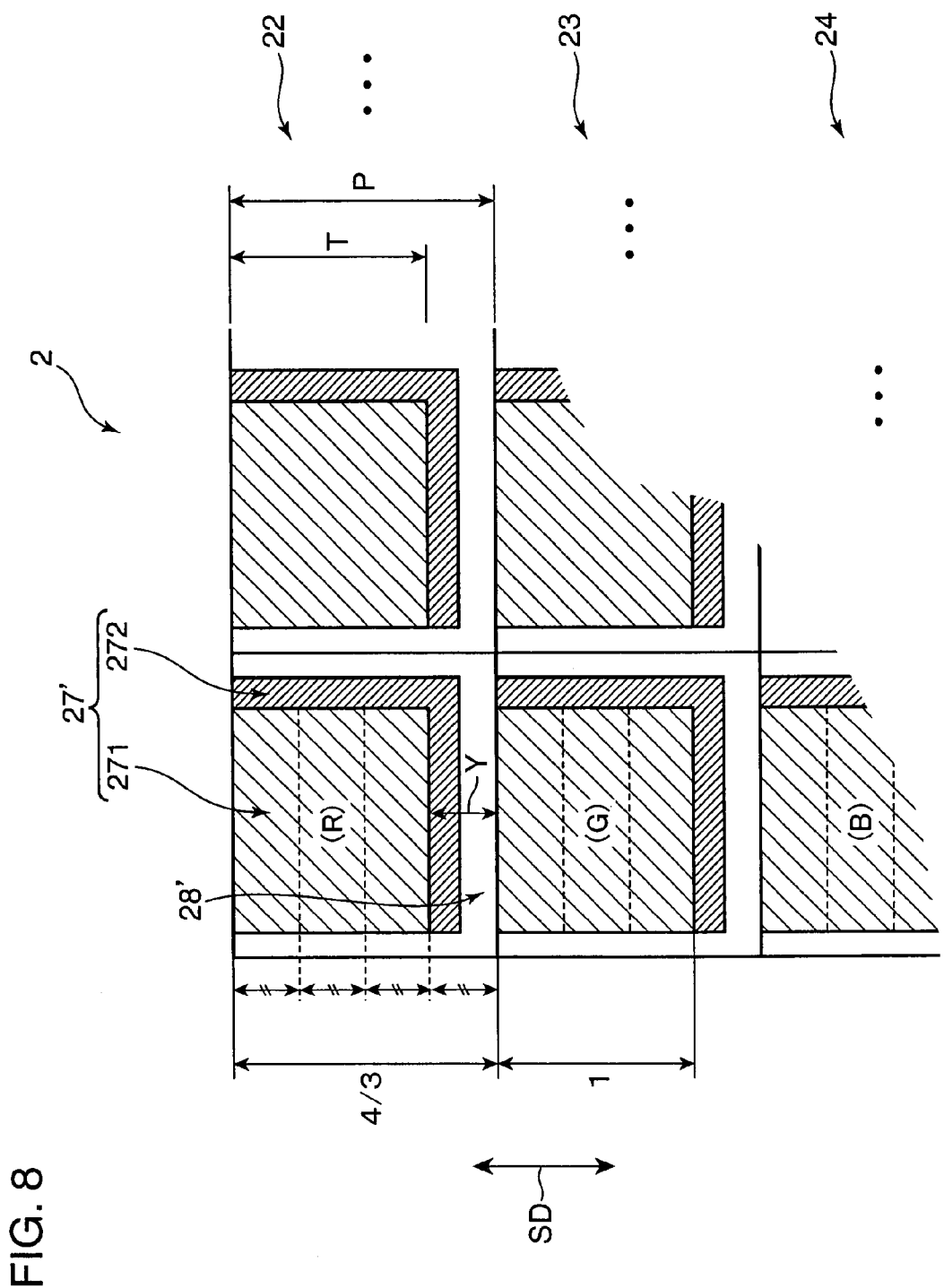
FIG. 8 is a diagram for describing a modification concerning a scanning operation of the linear sensor.

In the foregoing embodiment, as shown in FIG. 5, the pixel array pitch is set to at least $(n+1)/n$ times as large as the pixel width. Alternatively, the pixel array pitch may be set to at least $(n+1)/n$ times as large as a photoelectric converter width. Specifically, as shown in FIG. 8, the pixel 27 is a pixel 27' including a photoelectric converter 271 and a peripheral circuit 272, and a certain number of the linearly arranged pixels 27' constitute a one-dimensional pixel array corresponding to the R, G, B sensor array 22, 23, 24, i.e. R, G, B pixel array. The photoelectric converter 271 corresponds to the photodiode PD1. The peripheral circuit 272 is a circuit section having e.g. an L-shape, and is arranged in the periphery of the photoelectric converter 271. The peripheral circuit 272 includes the transistors T10, T11, T13, and the FD. In this modification, the pixel array pitch P may be set to at least $(n+1)/n$ times (in this modification, 4/3 times) as large as the width of the photoelectric converter 271 in the scanning direction SD (hereinafter, called as "photoelectric converter width T"). In the modification, a scanning operation with respect to a document image is performed in the similar manner as the embodiment. For instance, the pixel width W in the description referring to FIGS. 6 and 7 may be replaced by the photoelectric converter width T.

In the modification, the readout circuit 5 performs an image readout operation with respect to the respective one-dimensional pixel arrays, by utilizing a timing at which the line sensor 1 is moved from an imaging pitch position to a succeeding imaging pitch position each having a scanning pitch for scanning the document image by a distance corresponding to the width of a portion of an area having the pixel array pitch P other than the photoelectric converter 271. The portion of the area having the pixel array pitch P other than the photoelectric converter 271 has a width 1/n times as large as the photoelectric converter width T where $1/n(=n(n+1)/n-n/n)$, i.e. a width indicated by the symbol Y, which is the sum of the width of the peripheral circuit 272, and the width of the space 28' between the adjacent pixels 27' in the scanning direction SD.

Figure 9A:
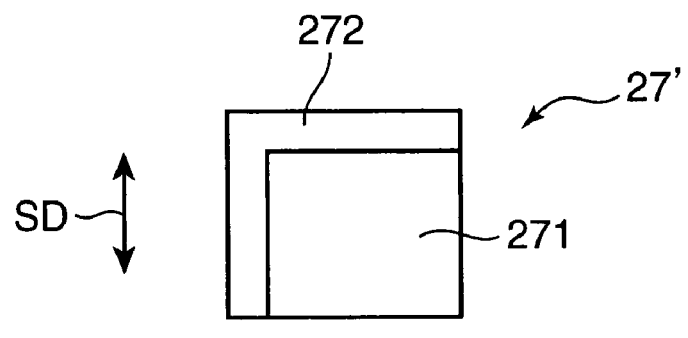
FIG. 9 is a diagram for describing a modification concerning a scanning operation of the linear sensor.
Figure 9B:
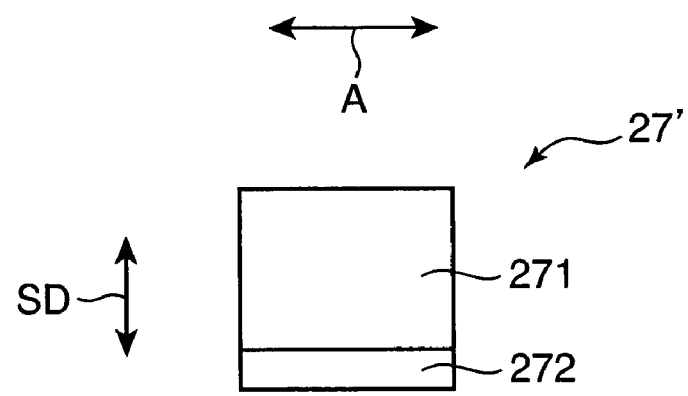

The arrangement i.e. the shapes of the photoelectric converter 271 and the peripheral circuit 272 of the pixel 27' is not limited to the above. As shown in FIG. 9A, for instance, the peripheral circuit 272 may be arranged at a position opposite to the position shown in FIG. 8 with respect to the scanning direction SD, or may be arranged at a position opposite to the position shown in FIG. 9A with respect to the direction of the arrows A. Further alternatively, as shown in FIG. 9B, the peripheral circuit 272 may have a linear shape, in place of the L-shape, and the linear peripheral circuit 272 may be arranged at one end or both ends of the photoelectric converter 271 in the scanning direction SD. Further alternatively, the peripheral circuit 272 may be arranged in the entire periphery of the photoelectric converter 271. As far as the peripheral circuit 272 has a certain width in the scanning direction SD, any arrangement is applicable. In the arrangement that the peripheral circuit 272 is arranged on both ends of the photoelectric converter 271 in the scanning direction SD, or in the entire periphery of the photoelectric converter 271, the width indicated by the symbol Y i.e. the width between the adjacent photoelectric converters 271 in the scanning direction SD includes the width of the space 28', and the widths of the two peripheral circuits 272 of the adjacent color pixels 27'.

As mentioned above, the linear sensor 1 according to the embodiment i.e. a solid-state image sensing device includes: none-dimensional pixel arrays i.e. the R sensor array 22, the G sensor array 23, and the B sensor array 24 for sensing a document image by relative movement of the linear sensor 1 and the document image in the scanning direction; and the readout circuit 5, commonly provided for the one-dimensional pixel arrays, for performing a horizontal readout operation with respect to the one-dimensional pixel arrays, wherein the pixel array pitch P of the one-dimensional pixel arrays is set to at least $(n+1)/n$ times as large as the pixel width W.

Since the readout circuit 5 for performing the horizontal readout operation from the one-dimensional pixel arrays is provided commonly for the one-dimensional pixel arrays, there is no need of providing the readout circuit 5 i.e. a horizontal readout circuit for each of the one-dimensional pixel arrays. In other words, as shown in FIG. 1, the one-dimensional pixel arrays can be arranged in a certain direction, and the common single readout circuit 5 can be provided for the one-dimensional pixel arrays. This arrangement enables to reduce the pixel array pitch P of the one-dimensional pixel arrays, and to simplify the construction of the solid-state image sensing device. Also, since the pixel array pitch P is set to at least $(n+1)/n$ times as large as the pixel width W, the readout circuit 5 is operative to perform image readout operations with respect to the one-dimensional pixel arrays, by utilizing the timing at which a pixel-non-existing part of an area having the pixel array pitch P is successively moved from one imaging pitch position to a succeeding imaging pitch position for scanning the document image. The pixel-non-existing part is a non-exposure part of the linear sensor 1 having a width $1/n$ times as large as the pixel width where $1/n=(n+1)/n-n/n$, which corresponds to the space 28 between the adjacent pixels 27. In other words, the above arrangement allows the readout circuit 5 to complete the image readout operations from all the one-dimensional pixel arrays during the time when the respective one-dimensional pixel arrays are moved by the distance corresponding to the image resolution pitch for scanning the document image in the scanning direction i.e. in the imaging direction. This enables to realize an image reading operation with suppressed color displacement in a reproduced image due to a scanning failure or the like.

The linear sensor 1 according to the modified embodiment i.e. the solid-state image sensing device (see FIG. 8) includes the pixels 27' each having the photoelectric converter 271 for generating a photocurrent by photoelectrically converting light incident onto the pixel, and the peripheral circuit 272 provided in the periphery of the photoelectric converter 271. The linear sensor 1 includes the n one-dimensional pixel arrays for sensing a document image by relative movement of the one-dimensional pixel arrays and the document image in the scanning direction; and the readout circuit 5, commonly provided for the one-dimensional pixel arrays, for performing a horizontal readout operation with respect to the one-dimensional pixel arrays, wherein the pixel array pitch of the one-dimensional pixel arrays is set to at least $(n+1)/n$ times as large as the width of the photoelectric converter 271 of the pixel 27' i.e. the photoelectric converter width T.

Since the readout circuit 5 for performing the horizontal readout operation from the one-dimensional pixel arrays is provided commonly for the one-dimensional pixel arrays, there is no need of providing the readout circuit 5 i.e. a horizontal readout circuit for each of the one-dimensional pixel arrays. In other words, the one-dimensional pixel arrays can be arranged in a certain direction, and the common single readout circuit 5 can be provided for the one-dimensional pixel arrays. This arrangement enables to reduce the pixel array pitch P of the one-dimensional pixel arrays, and to simplify the construction of the solid-state image sensing device. Also, since the pixel array pitch P is set to at least $(n+1)/n$ times as large as the photoelectric converter width T, the readout circuit 5 is operative to perform image readout operations with respect to the one-dimensional pixel arrays, by utilizing the timing at which a portion of an area having the pixel array pitch other than the photoelectric converter 271 is successively moved from one imaging pitch position to a succeeding imaging pitch position for scanning the document image. The portion of the area having the pixel array pitch other than the photoelectric converter 271 has a width $1/n$ times as large as the photoelectric converter width T where $1/n(=(n+1)/n-n/n)$, which is the sum of the width of the peripheral circuit 272, and the width of the space 28' between the adjacent pixels 27' in the scanning direction SD. In other words, the above arrangement allows the readout circuit 5 to complete the image readout operations from all the one-dimensional pixel arrays during the time when the respective one-dimensional pixel arrays are moved by the distance corresponding to the image resolution pitch for scanning the document image in the scanning direction i.e. the photoelectric converter width T. This enables to realize an image reading operation with suppressed color displacement in a reproduced image due to a scanning failure or the like.

Further, the readout controller 105 of the main controller 100 controls the readout circuit 5 to perform an image readout operation so that the image readout operations from all the one-dimensional pixel arrays are completed during the time when one of the one-dimensional pixel arrays is moved by the distance corresponding to the image resolution pitch for scanning the document image in the scanning direction i.e. the pixel width W or the photoelectric converter T. This enables to suppress color displacement in a reproduced image due to a scanning failure or the like.

Further, since the pixel array pitch P is set to $(n+1)/n$ times as large as the pixel width W or the photoelectric converter width T, or more, and is smaller than four times as large as the pixel width W or the photoelectric converter width T. In other words, by setting the upper limit of the pixel array pitch P to four times as large as the pixel width W or the photoelectric converter width T, the pixel array pitch P is set to four times as large as the pixel width W or the photoelectric converter width T, or more. This enables to securely prevent color displacement in a reproduced image due to a scanning failure or the like.

Further, the readout circuit 5 is connected to the vertical signal lines 26 which are wired with the one-dimensional pixel arrays in the scanning direction for image readout operations. The readout circuit 5 is a circuit for reading out, in a time-series manner, pixel signals i.e. image signals or noise signals from the pixels 21 of the one-dimensional pixel arrays. In other words, the readout circuit 5 is operative to read out the pixel signals from the pixels 21 of the one-dimensional pixel arrays in a time-series manner. This enables to easily realize a configuration that the image readout operations from all the one-dimensional pixel arrays are completed during the time when the one-dimensional pixel arrays are moved by the distance corresponding to the image resolution pitch for scanning the document image in the scanning direction, by using the readout circuit 5 having the aforementioned configuration, and the arrangement that the pixel array pitch P is set to at least (n+1)/n times as large as the pixel width W or the photoelectric converter width T.

Furthermore, each of the pixels 21 of the one-dimensional pixel arrays is an MOS-type image sensing element, which is provided with a photoelectric converter i.e. the photodiode PD1, a floating diffusion (FD), a reset transistor i.e. the transistor T11, a transfer transistor i.e. the transistor T10, an amplifier transistor i.e. the transistor T12, and a readout transistor i.e. the transistor T13 or a row selection transistor; or which is provided with the photoelectric converter 271, and the peripheral circuit 272 including a floating diffusion, a reset transistor, a transfer transistor, an amplifier transistor, and a readout transistor. This enables to eliminate transfer gates or CCD shift registers for performing horizontal readout operations from one-dimensional pixel arrays, as required in the case where pixels are e.g. CCD image sensing elements. In other words, this allows the readout circuit 5 commonly provided for the one-dimensional pixel arrays to perform the horizontal readout operations by the X-Y address system. Thus, the arrangement enables to reduce the pixel array pitch P of the one-dimensional pixel arrays, and to simplify the construction of the image sensing device.

Various modifications and/or alterations are applicable to the invention, as far as such modifications and/or alterations do not depart from the gist of the invention. For instance, the following modifications are proposed.

(A) In the embodiment, the linear sensor 1 is provided with the three sensor arrays of R, G and B. Alternatively, the linear sensor may be provided with plural sensor arrays such as two, or more than three sensor arrays.

(B) In the embodiment, the pixel array pitch P is set to (n+1)/n times as large as the pixel width W or the photoelectric converter width T. Alternatively, the pixel array pitch P may be set to (n+1)/n times as large as the pixel width W or the photoelectric converter width T, or more. In the modification, it is preferable to set the upper limit of the pixel array pitch P to e.g. smaller than four times as large as the pixel array pitch P or the photoelectric converter width T. In other words, the magnification of the pixel array pitch P to the pixel width W or the photoelectric converter width T is expressed by: (n+1)/n ≦ the magnification of the pixel array pitch P to the pixel width W or the photoelectric converter width T<4. Specifically, if the pixel array pitch P is set to 4/3 times as large as the pixel width W or the photoelectric converter width T, as in the embodiment or the modified embodiment, even if the R, G, and B sensor arrays 22, 23, and 24 are arranged with the pixel array pitch P which is 4/3 times as large as the pixel width W or the photoelectric converter width T, or more, the R, G, and B sensor arrays 22, 23, and 24 are operative to successively scan the document image at the positions coincident with the imaging pitch positions e.g. the imaging pitch positions indicated by the reference numerals 301, 302, and 303 in FIG. 7. In the modification, unlike the arrangement shown in FIG. 7, the respective scanning pitches PR for scanning the document image are larger than the pixel width W or the photoelectric converter width T. Accordingly, the image readout operations with respect to all the R, G, and B sensor arrays 22, 23, and 24 are completed during the time when e.g. an R pixel of the R sensor array 22 is moved for scanning by the scanning pitch PR which is larger than the pixel width W or the photoelectric converter width T. A larger scanning pitch means a larger image resolution pitch.

In the above arrangement, a high-speed scanning as a whole is executed by setting a switching frequency for the horizontal scanning circuit 4 and the readout circuit 5 to a frequency to be used in setting the pixel array pitch P to 4/3 times as large as the pixel width W or the photoelectric converter width T. Also, a scanning operation can be executed, with a lower switching frequency for the horizontal scanning circuit 4 and the readout circuit 5, if the whole scanning time is set to a time equal to a time required in the case where the pixel array pitch P is set to 4/3 times as large as the pixel width W or the photoelectric converter width T, in other words, if a low-speed scanning is performed as compared with the high-speed scanning. It is, however, desirable to set the pixel array pitch P to smaller than four times as large as the pixel width W or the photoelectric converter width T, because setting the pixel array pitch P four times as large as the pixel width W or the photoelectric converter width T, or more may cause unduly large color displacement in a reproduced image due to a scanning failure or the like.

Figure 10:
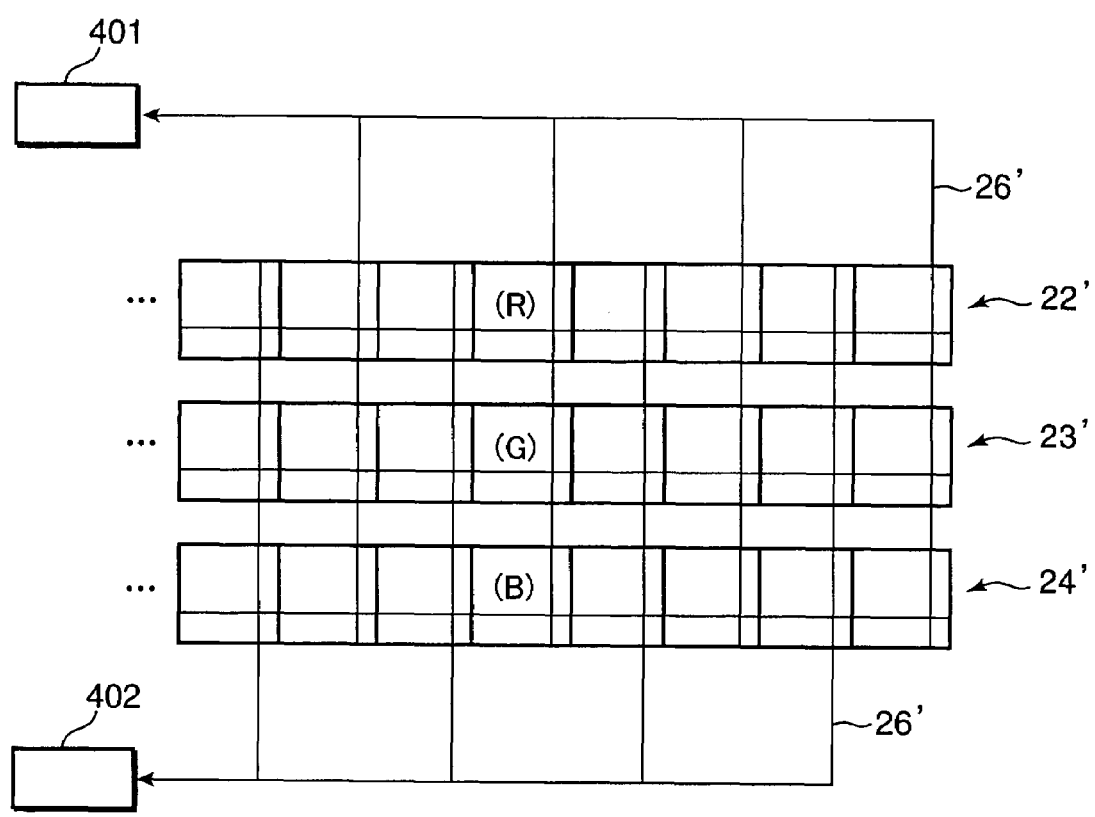
FIG. 10 is a diagram for describing a modification of the linear sensor.

(C) In the embodiment, as shown in FIG. 1, the single readout circuit 5 is provided as a readout circuit commonly provided for the R, G, and B sensor arrays 22, 23, and 24. Alternatively, plural readout circuits may be provided. For instance, as shown in FIG. 10, vertical signal lines 26' may be alternately connected to pixels of an R sensor array 22' and a B sensor array 24' among the R, G, and B sensor arrays 22', 23', and 24'. In the modification, the vertical signal lines 26' may be exclusively connected to the pixels of either one of the R sensor array 22' and the B sensor array 24'. For instance, two readout circuits 401 and 402 may be provided in correspondence to the vertical signal lines 26'. In the modification, the two readout circuits 401 and 402 serve as a readout circuit section i.e. a horizontal readout circuit section commonly provided for the R, G, and B sensor arrays 22', 23', and 24'.

(D) In the embodiment, all the three pixel arrays i.e. the R, G, and B sensor arrays are arranged with the same positional relations i.e. equidistantly one from the other. Alternatively, e.g. one of the pixel arrays may be arranged with a positional relation different from that of the other pixel arrays.

(E) In the embodiment, N channel MOSFETs are used in the pixels of the sensing section 2. Alternatively, P-channel MOSFETs may be used.

The aforementioned embodiment primarily embraces the inventions having the following arrangements.

A solid-state image sensing device according to one aspect of the invention is provided with n one-dimensional pixel arrays for sensing a document image by relative movement of the one-dimensional pixel arrays and the document image in a scanning direction. The solid-state image sensing device includes: an image readout circuit, commonly provided for the one-dimensional pixel arrays, for performing a horizontal readout operation from the one-dimensional pixel arrays with respect to image data acquired by sensing the document image, wherein a pixel array pitch between the one-dimensional pixel arrays in the scanning direction is set to at least $(n+1)/n$ times as large as a pixel width of each of pixels constituting the one-dimensional pixel arrays in the scanning direction, where the symbol "n" represents a positive integer of 2 or more, and the symbol "/" represents division.

The solid-state image sensing device according to the one aspect of the invention includes the n one-dimensional pixel arrays for sensing the document image by relative movement of the one-dimensional pixel arrays and the document image in the scanning direction, and the image readout circuit, commonly provided for the one-dimensional pixel arrays, for performing the horizontal readout operation from the one-dimensional pixel arrays. The pixel array pitch of the one-dimensional pixel arrays is set to at least $(n+1)/n$ times as large as the pixel width.

In the solid-state image sensing device according to the one aspect of the invention, the image readout circuit for performing the horizontal readout operation from the one-dimensional pixel arrays is commonly provided for the one-dimensional pixel arrays. Accordingly, there is no need of providing an image readout circuit i.e. a horizontal readout circuit for each of the one-dimensional pixel arrays. In other words, the one-dimensional pixel arrays can be arranged in a certain direction, and the single common image readout circuit can be provided for the one-dimensional pixel arrays. This arrangement enables to reduce the pixel array pitch of the one-dimensional pixel arrays, and to simplify the construction of the solid-state image sensing device. Also, since the pixel array pitch is set to at least $(n+1)/n$ times as large as the pixel width, the image readout circuit is operative to perform image readout operations from the one-dimensional pixel arrays by utilizing the timing at which the pixel-non-existing part of the area having the pixel array pitch is successively moved from one imaging pitch position to the succeeding imaging pitch position for scanning the document image. The pixel-non-existing part is a non-exposure part of the solid-state image sensing device having a width $1/n$ times as large as the pixel width where $1/n=(n+1)/n-n/n$, which corresponds to the space between the adjacent pixels. In other words, the above arrangement allows the image readout circuit to complete the image readout operations from all the one-dimensional pixel arrays during the time when the respective one-dimensional pixel arrays are moved by the distance corresponding to the image resolution pitch i.e. the pixel width for scanning the document image in the scanning direction. This enables to realize an image reading operation with suppressed color displacement in a reproduced image due to a scanning failure or the like.

A solid-state image sensing device according to another aspect of the invention is provided with n one-dimensional pixel arrays for sensing a document image by relative movement of the one-dimensional pixel arrays and the document image in a scanning direction, the one-dimensional pixel arrays each constituted of a number of one-dimensionally arranged pixels, the pixel including a photoelectric converter for generating a photocurrent by photoelectrically converting light incident onto the pixel, and a peripheral circuit provided in the periphery of the photoelectric converter. The solid-state image sensing device includes: an image readout circuit, commonly provided for the one-dimensional pixel arrays, for performing a horizontal readout operation from the one-dimensional pixel arrays with respect to image data acquired by sensing the document image, wherein a pixel array pitch of the one-dimensional pixel arrays in the scanning direction is set to at least $(n+1)/n$ times as large as a photoelectric converter width of the photoelectric converter in the scanning direction, where the symbol "n" represents a positive integer of 2 or more, and the symbol "/" represents division.

In the solid-state image sensing device according to the another aspect of the invention, the pixel includes the photoelectric converter for generating the photocurrent by photoelectrically converting the light incident onto the pixel, and the peripheral circuit provided in the periphery of the photoelectric converter. The solid-state image sensing device includes the n one-dimensional pixel arrays for sensing the document image by relative movement of the one-dimensional pixel arrays and the document image in the scanning direction, and the image readout circuit, commonly provided for the one-dimensional pixel arrays, for performing the horizontal readout operation from the one-dimensional pixel arrays. The pixel array pitch of the one-dimensional pixel arrays is set to at least $(n+1)/n$ times as large as the photoelectric converter width of the photoelectric converter of each pixel.

In the solid-state image sensing device according to the another aspect of the invention, the image readout circuit for performing the horizontal readout operation from the one-dimensional pixel arrays is commonly provided for the one-dimensional pixel arrays. Accordingly, there is no need of providing an image readout circuit i.e. a horizontal readout circuit for each of the one-dimensional pixel arrays. In other words, the one-dimensional pixel arrays can be arranged in a certain direction, and the single common image readout circuit can be provided for the one-dimensional pixel arrays. This arrangement enables to reduce the pixel array pitch of the one-dimensional pixel arrays, and to simplify the construction of the solid-state image sensing device. Also, since the pixel array pitch is set to at least $(n+1)/n$ times as large as the photoelectric converter width, the image readout circuit is operative to perform image readout operations from the one-dimensional pixel arrays by utilizing the timing at which a portion of the area having the pixel array pitch other than the photoelectric converter is successively moved from one imaging pitch position to a succeeding imaging pitch position for scanning the document image. The portion of the area having the pixel array pitch other than the photoelectric converter has a width $1/n$ times as large as the photoelectric converter width where $1/n=n(n+1)/n-n/n)$, which is the sum of the width of the peripheral circuit in the scanning direction, and the width of the space between the adjacent pixels. In other words, the above arrangement allows the image readout circuit to complete the image readout operations from all the one-dimensional pixel arrays during the time when the respective one-dimensional pixel arrays are moved by the distance corresponding to the image resolution pitch i.e. the photoelectric converter width for scanning the document image in the scanning direction. This enables to realize an image reading operation with suppressed color displacement in a reproduced image due to a scanning failure or the like.

Preferably, the solid-state image sensing device according to the one aspect of the invention may further include a controller for controlling the image readout circuit to perform an image readout operation in such a manner that the image readout operation from all the one-dimensional pixel arrays is completed during a time when one of the one-dimensional pixel arrays is moved by a distance corresponding to an image resolution pitch for scanning the document image in the scanning direction.

In the solid-state image sensing device according to the one aspect of the invention, the controller controls the image readout circuit to perform the image readout operation in such a manner that the image readout operation from all the one-dimensional pixel arrays is completed during the time when one of the one-dimensional pixel arrays is moved by the distance corresponding to the image resolution pitch i.e. the pixel width for scanning the document image in the scanning direction. This enables to suppress color displacement in a reproduced image due to a scanning failure or the like.

Preferably, the solid-state image sensing device according to the another aspect of the invention may further include a controller for controlling the image readout circuit to perform an image readout operation in such a manner that the image readout operation from all the one-dimensional pixel arrays is completed during a time when one of the one-dimensional pixel arrays is moved by a distance corresponding to an image resolution pitch for scanning the document image in the scanning direction.

In the solid-state image sensing device according to the another aspect of the invention, the controller controls the image readout circuit to perform the image readout operation in such a manner that the image readout operation from all the one-dimensional pixel arrays is completed during the time when one of the one-dimensional pixel arrays is moved by the distance corresponding to the image resolution pitch i.e. the photoelectric converter width for scanning the document image in the scanning direction. This enables to suppress color displacement in a reproduced image due to a scanning failure or the like.

In the solid-state image sensing device according to the one aspect of the invention, preferably, the pixel array pitch may be set to (n+1)/n times as large as the pixel width or more, and may be set smaller than four times as large as the pixel width.

In the above arrangement, the pixel array pitch is set to (n+1)/n times as large as the pixel width or more, and is set smaller than four times as large as the pixel width. In other words, by setting the upper limit of the pixel array pitch to four times as large as the pixel width, color displacement in a reproduced image due to a scanning failure or the like can be securely prevented.

In the solid-state image sensing device according to the another aspect of the invention, preferably, the pixel array pitch may be set to (n+1)/n times as large as the photoelectric converter width or more, and may be set smaller than four times as large as the photoelectric converter width.

In the above arrangement, the pixel array pitch is set to (n+1)/n times as large as the photoelectric converter width or more, and is set smaller than four times as large as the photoelectric converter width. In other words, by setting the upper limit of the pixel array pitch to four times as large as the photoelectric converter width, color displacement in a reproduced image due to a scanning failure or the like can be securely prevented.

In the solid-state image sensing device according to the one aspect of the invention, preferably, the image readout circuit may be a circuit which is connected to vertical signal lines wired with the one-dimensional pixel arrays in the scanning direction for an image readout operation, the image readout circuit being operative to read out, in a time-series manner, pixel signals from the pixels of the one-dimensional pixel arrays.

In the solid-state image sensing device according to the one aspect of the invention, since the image readout circuit is connected to the vertical signal lines wired to the one-dimensional pixel arrays in the scanning direction for the image readout operation, the pixel signals can be read out from the pixels of the one-dimensional pixel arrays in a time-series manner.

In the solid-state image sensing device according to the another aspect of the invention, preferably, the image readout circuit may be a circuit which is connected to vertical signal lines wired with the one-dimensional pixel arrays in the scanning direction for an image readout operation, the image readout circuit being operative to read out, in a time-series manner, pixel signals from the pixels of the one-dimensional pixel arrays.

In the solid-state image sensing device according to the another aspect of the invention, since the image readout circuit is connected to the vertical signal lines wired to the one-dimensional pixel arrays in the scanning direction for the image readout operation, the pixel signals can be read out from the pixels of the one-dimensional pixel arrays in a time-series manner.

The arrangements of the solid-state image sensing devices according to the one aspect and the another aspect of the invention allow the image readout circuit to read out, in a time-series manners, pixel signals from the pixels of the one-dimensional pixel arrays. The arrangements allow the image readout circuit to easily complete the image readout operations from all the one-dimensional pixel arrays during the time when the respective one-dimensional pixel arrays are moved by the distance corresponding to the image resolution pitch for scanning the document image in the scanning direction, by using the image readout circuit having the aforementioned arrangement, and the arrangement that the pixel array pitch is set to at least (n+1)/n times as large as the pixel width or the photoelectric converter width.

In the solid-state image sensing device according to the one aspect of the invention, preferably, the each of the pixels constituting the one-dimensional pixel arrays may be an MOS-type image sensing element including: a photoelectric converter for generating a photocurrent by photoelectrically converting light incident onto the pixel; a floating diffusion for accumulating an electric charge from the photoelectric converter to convert the electric charge into a voltage; a reset transistor for applying a reset bias to the floating diffusion; a transfer transistor for switching over between transfer and non-transfer of the photocurrent to the floating diffusion; an amplifier transistor for amplifying a signal from the floating diffusion; and a readout transistor for switching over between readout and non-readout of a signal from the pixel after amplification by the amplifier transistor.

In the solid-state image sensing device according to the one aspect of the invention, the each of the pixels constituting the one-dimensional pixel arrays is the MOS-type image sensing element including the photoelectric converter, the floating diffusion, the reset transistor, the transfer transistor, the amplifier transistor, and the readout transistor.

In the solid-state image sensing device according to the another aspect of the invention, preferably, the each of the pixels constituting the one-dimensional pixel arrays may be an MOS-type image sensing element including: the photoelectric converter; and the peripheral circuit having a floating diffusion for accumulating an electric charge from the photoelectric converter to convert the electric charge into a voltage, a reset transistor for applying a reset bias to the floating diffusion, a transfer transistor for switching over between transfer and non-transfer of the photocurrent to the floating diffusion, an amplifier transistor for amplifying a signal from the floating diffusion, and a readout transistor for switching over between readout and non-readout of a signal from the pixel after amplification by the amplifier transistor.

In the solid-state image sensing device according to the another aspect of the invention, the each of the pixels constituting the one-dimensional pixel arrays is the MOS-type image sensing element including the photoelectric converter, and the peripheral circuit having the floating diffusion, the reset transistor, the transfer transistor, the amplifier transistor, and the readout transistor.

In the solid-state image sensing devices according to the one aspect and the another aspect of the invention, the each of the pixels constituting the one-dimensional pixel arrays is the MOS-type image sensing element, which includes the photoelectric converter, the floating diffusion, the reset transistor, the transfer transistor, the amplifier transistor, and the readout transistor, or which includes the photoelectric converter, and the peripheral circuit having the floating diffusion, the reset transistor, the transfer transistor, the amplifier transistor, and the readout transistor. This enables to eliminate transfer gates or CCD shift registers for performing a horizontal readout operation from one-dimensional pixel arrays, as required in the case where pixels are e.g. CCD image sensing elements. In other words, this enables to perform a horizontal readout operation, using the image readout circuit commonly provided for the one-dimensional pixel arrays by the X-Y address system. Thus, the arrangement enables to reduce the pixel array pitch of the one-dimensional pixel arrays, and to simplify the constructions of the solid-state image sensing devices.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A solid-state image sensing device provided with n one-dimensional pixel arrays for sensing a document image by relative movement of the one-dimensional pixel arrays and the document image in a scanning direction, the solid-state image sensing device comprising:
    an image readout circuit, commonly provided for the one-dimensional pixel arrays, for performing a horizontal readout operation from the one-dimensional pixel arrays with respect to image data acquired by sensing the document image, wherein
    a pixel array pitch of the one-dimensional pixel arrays in the scanning direction is set to at least (n+1)/n times as large as a pixel width of each of pixels constituting the one-dimensional pixel arrays in the scanning direction, where the symbol "n" represents a positive integer of 2 or more, and the symbol "/" represents division.

2. The solid-state image sensing device according to claim 1, further comprising a controller for controlling the image readout circuit to perform an image readout operation in such a manner that the image readout operation from all the one-dimensional pixel arrays is completed during a time when one of the one-dimensional pixel arrays is moved by a distance corresponding to an image resolution pitch for scanning the document image in the scanning direction.

3. The solid-state image sensing device according to claim 1, wherein
    the pixel array pitch is set to (n+1)/n times as large as the pixel width or more, and is set smaller than four times as large as the pixel width.

4. The solid-state image sensing device according to claim 1, wherein
    the image readout circuit is a circuit which is connected to vertical signal lines wired with the one-dimensional pixel arrays in the scanning direction for an image readout operation, the image readout circuit being operative to read out, in a time-series manner, pixel signals from the pixels of the one-dimensional pixel arrays.

5. The solid-state image sensing device according to claim 1, wherein
    the each of the pixels constituting the one-dimensional pixel arrays is an MOS-type image sensing element including:
    a photoelectric converter for generating a photocurrent by photoelectrically converting light incident onto the pixel;
    a floating diffusion for accumulating an electric charge from the photoelectric converter to convert the electric charge into a voltage;
    a reset transistor for applying a reset bias to the floating diffusion;
    a transfer transistor for switching over between transfer and non-transfer of the photocurrent to the floating diffusion;
    an amplifier transistor for amplifying a signal from the floating diffusion; and
    a readout transistor for switching over between readout and non-readout of a signal from the pixel after amplification by the amplifier transistor.

6. A solid-state image sensing device provided with n one-dimensional pixel arrays for sensing a document image by relative movement of the one-dimensional pixel arrays and the document image in a scanning direction, the one-dimensional pixel arrays each constituted of a number of one-dimensionally arranged pixels, the pixel including a photoelectric converter for generating a photocurrent by photoelectrically converting light incident onto the pixel, and a peripheral circuit provided in the periphery of the photoelectric converter, the solid-state image sensing device comprising:
    an image readout circuit, commonly provided for the one-dimensional pixel arrays, for performing a horizontal readout operation from the one-dimensional pixel arrays with respect to image data acquired by sensing the document image, wherein
    a pixel array pitch of the one-dimensional pixel arrays in the scanning direction is set to at least (n+1)/n times as large as a photoelectric converter width of the photoelectric converter in the scanning direction, where the symbol "n" represents a positive integer of 2 or more, and the symbol "/" represents division.

7. The solid-state image sensing device according to claim 6, further comprising a controller for controlling the image readout circuit to perform an image readout operation in such a manner that the image readout operation from all the one-dimensional pixel arrays is completed during a time when one of the one-dimensional pixel arrays is moved by a distance corresponding to an image resolution pitch for scanning the document image in the scanning direction.

8. The solid-state image sensing device according to claim 6, wherein
    the pixel array pitch is set to (n+1)/n times as large as the photoelectric converter width or more, and is set smaller than four times as large as the photoelectric converter width.

9. The solid-state image sensing device according to claim 6, wherein
    the image readout circuit is a circuit which is connected to vertical signal lines wired with the one-dimensional pixel arrays in the scanning direction for an image readout operation, the image readout circuit being operative to read out, in a time-series manner, pixel signals from the pixels of the one-dimensional pixel arrays.

10. The solid-state image sensing device according to claim 6, wherein the each of the pixels constituting the one-dimensional pixel arrays is an MOS-type image sensing element including:

the photoelectric converter; and the peripheral circuit having a floating diffusion for accumulating an electric charge from the photoelectric converter to convert the electric charge into a voltage, a reset transistor for applying a reset bias to the floating diffusion, a transfer transistor for switching over between transfer and non-transfer of the photocurrent to the floating diffusion, an amplifier transistor for amplifying a signal from the floating diffusion, and a readout transistor for switching over between readout and non-readout of a signal from the pixel after amplification by the amplifier transistor.

* * * * *